United States Patent
Varsanyi et al.

[11] 3,879,388
[45] Apr. 22, 1975

[54] 2-GUANADINO-4,6-BIS-AMINO-S-TRIAZINES

[75] Inventors: Denis Varsanyi, Arlesheim; Willy Roth, Strengelbach, both of Switzerland

[73] Assignee: Geigy Chemical Corporation, Ardsley, N.Y.

[22] Filed: Sept. 16, 1971

[21] Appl. No.: 181,265

Related U.S. Application Data

[62] Division of Ser. No. 672,733, Oct. 4, 1967, abandoned.

[30] Foreign Application Priority Data
Oct. 27, 1966   Switzerland.................. 15588/66

[52] U.S. Cl. ....... 260/249.6; 260/243 B; 260/246 B; 260/247.5 C; 106/3; 106/10; 106/36
[51] Int. Cl. ............................................ C07d 55/22
[58] Field of Search .......... 260/249.6, 247.5 R, 268, 260/246 B

[56] References Cited
UNITED STATES PATENTS

| | | | |
|---|---|---|---|
| 1,915,334 | 6/1933 | Salzberg et al. | 260/293.51 |
| 2,075,359 | 3/1937 | Salzberg et al. | 260/293.51 |
| 2,362,614 | 11/1944 | Calva | 424/325 |
| 3,053,843 | 9/1962 | Gysin et al. | 260/249.6 |

*Primary Examiner*—Alton D. Rollins
*Assistant Examiner*—Jose Tovar
*Attorney, Agent, or Firm*—Frederick H. Rabin

[57] ABSTRACT

Novel 2-guanidino-4,6-bis-amino-s-triazines as well as quaternary and acid addition salts thereof and salts of certain of the novel s-triazines in which the latter constitute the anion are described, in which the guanidino substituent is of the formula

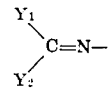

and each of $Y_1$ and $Y_2$ as well as each of the substituents in 4- and 6-position at the s-triazine nucleus are amino groups substituted by one or two organic radicals or are certain heterocyclic radicals, at least one of the substituents of amino nitrogen atoms in the molecule being a long chain organic radical of at least 10 and up to 22 carbon atoms; and which have wax-like properties and are useful as components in novel surface treating agents, especially in combination with conventional ingredients in compositions for the treatment of surfaces, such as natural and synthetic waxes, resins, silicones, inorganic and organic fillers, detergents and other surfactants, pigments, stabilizing agents and the like conventional adjuvants; the aforesaid novel s-triazine derivatives afford, among other advantages, high gloss and at the same time often very satisfactory antislip effects to the treated surfaces. They are also useful as textile softeners.

4 Claims, No Drawings

2-GUANADINO-4,6-BIS-AMINO-S-TRIAZINES

This is a division of application Ser. No. 672,733, filed on Oct. 4, 1967, now abandoned.

DESCRIPTION OF THE INVENTION

The present invention relates to certain novel 2-guanidino-4,6-bis-amino-s-triazines and to surface treating agents containing them as waxlike components which serve particularly to impart high gloss and antislip effects to surfaces treated therewith.

By the term "surface treating agent" as used in the following description of the invention, there are to be understood compositions which are useful for the treatment of surfaces of all types to clean the same and impart to them gloss and, preferably, at the same time, an antislip effect. Such surfaces can be those of inorganic materials such as stone, tile, metal articles, etc., or they can be surfaces of organic materials such as wood, leather, synthetic plastics, e.g. linoleum, textile fiber materials and paper.

We have found that certain 2-guanidino-4,6-bis-amino-s-triazines have wax-like properties and, therefore, are valuable as components of surface finishes. Such waxy s-triazines correspond to the general formula

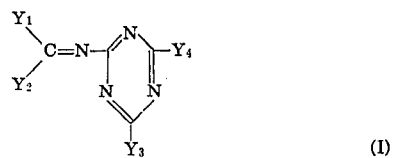

(I)

wherein $Y_1$, $Y_2$, $Y_3$ and $Y_4$ independently of each other each represent an amino group substituted by one or two organic radicals, or an unsubstituted or substituted, saturated, 3 to 7-membered nitrogen heterocycle bound by way of a ring nitrogen atom, which heterocycle can contain further hetero atoms, and wherein at least one amino group present is substituted by a long chain organic radical which is preferably an aliphatic radical of from 10 to at most 22 carbon atoms.

When the symbols $Y_1$, $Y_2$, $Y_3$ and/or $Y_4$ represent amino groups which are substituted by one or two organic radicals, then radicals of aliphatic (open chain and cyclo-aliphatic), aromatic, araliphatic or heterocyclically substituted aliphatic amines, preferably radicals of aliphatic, primary or secondary amines are meant at least one of them bearing the above-mentioned long chain radical. Aliphatic substituents of the amino group are, in particular, straight or branched chain alkyl and alkenyl radicals having 1 to 22 carbon atoms. The aliphatic substituent of a secondary amino group is, preferably, one having 6 to 22 and, more preferably 10 to 22, carbon atoms, while, in the case of the two radicals of a tertiary amino group, the one is preferably an alkyl or alkenyl radical having 1 to 6 carbon atoms and the other is the aforesaid long chain substituent containing from 10 to 22 carbon atoms. At least one such long chain substituent must be present at one of the primary or secondary amino groups. These alkyl and alkenyl radicals can be unsubstituted or mono- or polysubstituted. Suitable saturated nitrogen heterocyclic radicals bound by way of a nitrogen atom in their ring to the s-triazine nucleus are, preferably, 5 to 7-membered rings which, in addition to nitrogen, can also contain as ring members other hetero atoms such as oxygen and/or sulfur. Examples thereof are pyrrolidino, piperidino, piperazino, 4-lower alkylpiperazino, morpholino, thiomorpholino as well as hexahydro-azepino and -diazepino groups. These heterocyclic groups can be unsubstituted or mono- or polysubstituted, e.g. by lower alkyl, halogeno- lower alkyl and/or other substituents.

The 2-guanidino-4,6-bis-amino-s-triazines contained in the surface treating agents according to the invention can be produced by the process described in U.S. Pat. No. 3,053,843, by exchanging the four halogen atoms of the tetrameric cyanogen halide for the corresponding radicals of primary or secondary amines or heterocyclic bases which have at least one NH—group as ring member, the exchange being made in the presence of an acid binding agent and a solvent.

The 2-guanidino-4,6-bis-amino-s-triazines of Formula I have characteristic melting ranges and have wax-like properties; they can be used, therefore, instead of or together with the usual commercial natural or synthetic waxes for the treatment and protection of surfaces of all types. They have the characteristic properties of natural waxes such as solubility in solvents for fat, miscibility with natural and synthetic waxes and, with the addition of suitable emulsifying agents, they can be worked up in water into finely dispersed emulsions. Such emulsions produce coatings which are resistant to chemicals; they especially have good alkali-resistance. In their excellent suitablility as waxes, they are equivalent to the montanic acid esters.

The metal and ammonium salts, the addition salts of inorganic and organic acids and the quaternary ammonium salts of the compounds of Formula I have similar properties and can be used instead of or together with natural waxes for the above-described purposes. The production of these salts from the compounds of Formula I is carried out by well-known methods which have been described, for instance, in British Pat. No. 922,830, Swiss Pat. No. 404,335 and Belgian Pat. No. 620,374.

Surface treating agents according to the invention are obtained by mixing a guanidino-s-triazine derivative of Formula I or several such derivatives with the usual substances which are suitable for the treatment of surfaces, and comprise, as important components, diluting adjuvants compatible with the said triazine derivatives and which are admixed with the latter in sufficient amount for permitting uniform distribution of said agents on surfaces to be treated therewith. Such substances are, for example, (a) body-giving adjuvants such as natural and synthetic waxes, resins, silicones, etc. which improve the physical properties, as well as inorganic and organic fillers, e.g. silicates, milled plastics; (b) solvents; (c) anionic cationic or non-ionic solids-dispersing and emulsifying agents; (d) detergents such as natural and synthetic wetting agents, e.g. soaps; (e) pigments; (f) agents to improve the stability to light; (g) stabilizers of all types such as corrosion inhibitors; and (h) miscellaneous other adjuvants, such as scents, dyestuffs, biocidally active substances or agents containing such substances, e.g. insecticides, fungicides, bactericides, etc.

The content of compounds of Formula I in such agents ranges from 0.2 to preferably not more than about 50%, of the total weight of the agent.

The compounds of Formula I, and the above-mentioned salts thereof, can be used in these agents instead of natural waxes or together therewith for the treatment and protection of such surfaces as, for example, surfaces of inorganic materials, e.g. metal surfaces such as chromed metal parts, polished stone, ceramic tiles, but also as gloss-imparting and surface-protecting agents for surfaces of organic materials, e.g. wood, leather, plastic resinous material such as linoleum; on automobile bodies etc.; on textiles as hydrophilic agents; and on paper as carriers for copying layers. Surfaces treated therewith can be given a high gloss by polishing lightly.

The surface treating agents according to the invention can be in the form of and be used as aerosols, solutions, emulsions, semi-solid and solid pastes. The agents can thus serve to treat and protect surfaces of all types, in which is also included the treatment of paper, e.g. the production of carbon paper.

In particular, the surface treating agents according to the invention serve as floor polishes to render floors of all kinds of material smooth and glossy, while at the same time having an anti-slip effect. Floors to which the agents according to the invention have been applied, show a fine gloss, many of the novel s-triazine derivatives being self-polishing, or the gloss of such treated floors and the like surfaces can be enhanceed by subsequent rubbing with a soft cloth or the like well-known techniques. Floor polishes according to the invention can be applied to unsealed as well as to sealed floors.

However, the surface-treating agents according to the invention are not, themselves, wood-sealing agents; the latter agents are resinous compounds which close up the pores of floors made of wood or the like, permanently or at least for a great length of time, e.g. for several years.

Compounds falling under Formula I which are of particular importance because of their good accessibility and satisfactory performance in surface treating agents as described above, are the guanidino-s-triazines of the formula

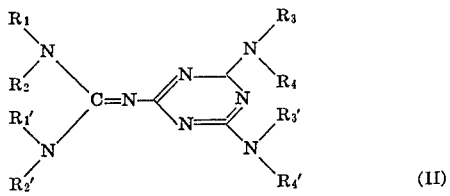

(II)

wherein
each of $R_1$, $R_1'$, $R_3$ and $R_3'$ represents hydrogen or alkyl of from 1 to 6 carbon atoms,
each of $R_2$, $R_2'$, $R_4$ and $R_4'$ represents alkyl of from 1 to 22 carbon atoms, alkenyl of from 2 to 22 carbon atoms, hydroxy-alkyl of from 2 to 18 carbon atoms, alkyl of from 1 to 18 carbon atoms substituted by $-COO^-M^+$ or by

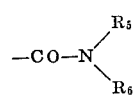

wherein
each of $R_5$ and $R_6$ represents hydrogen, lower alkyl or hydroxy-lower alkyl, alkenyl of from 3 to 18 carbon atoms substituted by $-COO^-M^+$, halogeno-alkyl of from 3 to 18 carbon atoms wherein the halogeno substituent has an atomic number of at most 35, morpholino-lower alkyl, monocyclic cycloalkyl of from 3 to 12 carbon atoms, bicyclic cycloalkyl or tricyclic cycloalkyl, each of which two last-mentioned groups has from 5 to 12 carbon atoms, a grouping of the formula

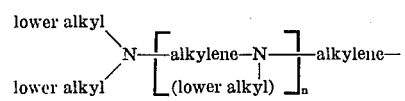

or a grouping of the formula

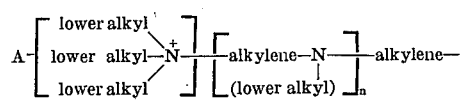

in which
groupings "alkylene" has from 2 to 6 and preferably from 2 to 3 carbon atoms,
$n$ represents an integer ranging from 0 to 3, and
$A^-$ represents a halogen ion, preferably the chloride, bromide or iodide ion,
or from one to three of the pairs ($R_1$ and $R_2$), ($R_1'$ and $R_2'$), ($R_3$ and $R_4$) and ($R_3'$ and $R_4'$) taken together with that nitrogen atom to which each pair is linked represents aziridino, azetidino, pyrrolidino, piperidino, 4-lower alkyl-piperazino, morpholino, hexamethyleneimino, N''-lower alkyl-hexahydrodiazepino, or the grouping

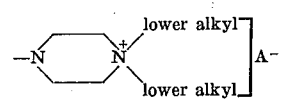

at least one of the aforesaid amino substituents $R_2$, $R_2'$, $R_4$ and $R_4'$ being a long chain aliphatic radical as defined above having from 10 to 22 carbon atoms, the total number of carbon atoms in all of these amino substituents taken together being at least 20; and
$M^+$ represents one equivalent weight of a preferably non-color imparting cation, hydrogen or alkali metal ion being preferred, .
and the addition salts of the triazines of Formula II with inorganic or organic acids.

Of special importance are those compounds falling under Formula II in which the groupings

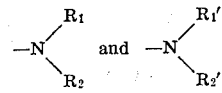

are identical because these compounds are easier to produce than those in which the two groupings are different.

Particularly preferred because of a combination of optimal high gloss and anti-slip effects imparted to surfaces treated therewith are those compounds falling under Formula II in which each of $R_2$ and $R_2'$ represents alkyl of from 1 to 22 carbon atoms, alkenyl of from 2 to 22 carbon atoms, or hydroxy-lower alkyl.

"Lower" used in connection with an aliphatic radical means that such radical has at most 5 carbon atoms.

The following non-limitative examples illustrate the invention further. Parts and percentages are given therein by weight and the temperatures are in degrees Centigrade.

EXAMPLE I

| | |
|---|---|
| a) | 4.95 Parts of 2-(1',3'-di-n-octadecyl-guanidino)-4-n-octadecylamino-6-[(3''-morpholino-propyl)-amino]-s-triazine, |
| | 4.05 parts of petroleum wax [ M.P.: 86–88°; acid No. (A.N.) 13–16; saponification No. (S.N.) 45 – 55; penetration 4 – 6 at 100 g/25°/5 sec.], |
| | 0.63 part of the condensation product of oleyl alcohol and ethylene oxide (molar ratio about 1:5), as emulsifier, |
| | 0.54 part of olein, |
| | 0.54 part of aminomethyl propanol, |
| | 77.89 parts of water, |
| b) | 1.20 parts of colophonium-modified phenolic resin having a melting point of about 152°, the phenolic resin base of which is produced as described in Example 2 of U.S. Pat. No. 2,532,374, |
| | 0.40 part of concentrated ammonia |
| | 8.40 parts of water |
| c) | 0.02 part of trimethyl-(γ-perfluoro-octylamide-propylene)-ammonium iodide as wetting agent, |
| | 0.40 part of tris-(butoxyethyl)-phosphate, |
| | 0.98 part of water. |

The components of the mixture a), with the exception of the water, are melted at 150°, the homogeneous melt is cooled to 100° – 110° and slowly added to the amount given of boiling water while stirring vigorously. The emulsion formed is cooled to room temperature and, while stirring, first the mixture b) and then mixture c) are added.

The resultant emulsion wax is excellently suited for the care of modern floorings. On polyvinyl chloride tiles a gloss value of 29.0 is attained therewith while an emulsion produced according to the present example in which the wax according to the invention is replaced by carnauba wax, only attains a gloss value of 16.0. In addition, floorings treated with the wax emulsion produced according to the above example are considerably less slippery than those which have been treated with carnauba wax.

EXAMPLE II

| | |
|---|---|
| a) | 4.250 Parts of 2-(1',3'-di-n-octadecyl-guanidino)-4-n-octadecylamino-6-(4''-methylpiperazine)-s-triazine, |
| | 4.250 parts of montanic acid wax (M.P.: 80–83°; A.N.: 20–30; S.N.: 135–150), |
| | 4.250 parts of petroleum wax (M.P.: 86–88°; A.N.: 13–16; S.N.: 45–55; penetration: 4 – 6 at 100 g/25°/5 sec), |
| | 0.850 part of olein, |
| | 0.765 part of the same emulsifier as used in Example 1, |
| | 0.680 part of aminomethyl propanol, |
| | 69.955 parts of water; |
| b) | 2.250 parts of the same colophonium-modified phenolic resin as used in Example I, |
| | 0.675 part of concentrated ammonia, |
| | 12.075 parts of water. |

The components of mixture a), with the exception of the water, are melted at 150°, the homogeneous melt is cooled to 100°–110° and added slowly, while stirring, to the amount given of boiling water. The emulsion formed is cooled to room temperature and the mixture b) is added thereto while stirring.

The resultant emulsion wax is excellently suited for the care of modern floorings. A self-polishing gloss is obtained which may be improved by polishing. If the coating on polyvinyl chloride tiles is washed with a moist cloth, the gloss value is raised from 45.0 to 51.0 whereas when an emulsion is produced according to the above example in which the wax according to the invention is replaced by carnauba wax, washing only raises the gloss value from 45.0 to 47.0.

EXAMPLE III

| | |
|---|---|
| a) | 2.24 Parts of 2-(1',3'-diemthyl-1',3'-di-n-octadecyl-guanidino)-4-(N-methyl-N-n-octadecyl-amino)-6-[3''-(N,N-diemthylamino)-propylamino]-s-triazine, |
| | 1.68 parts of carnauba wax, |
| | 1.68 parts of a montanic acid ester wax (M.P.: 80–83°; A.N.: 20–30; S.N.: 135–150), |
| | 0.44 part of the same emulsifier as used in Example I, |
| | 0.40 part of olein, |
| | 0.40 part of aminomethyl propanol, |
| | 33.16 parts of water; |
| b) | 16.70 parts of an aqueous dispersion of polystyrene (emulsion polymer) having a solids content of about 36% by weight, |
| | 0.10 part of the condensation product of nonylphenol and ethylene oxide (molar ratio about 1:15) |
| | 23.20 parts of water; |
| c) | 3.00 parts of alkali-soluble pentaerithrytol resinate polyester resin having a melting range 169–181° and an acid number of 190–200, as levelling agent, |
| | 1.00 part of concentrated ammonia, |
| | 16.00 parts of water. |

The components of the mixture a), with the exception of the water, are melted at 150°, the homogeneous melt is cooled to 100-100° and slowly added, while stirring, to the amount given of boiling water. The emulsion formed is cooled to room temperature and, while stirring, first the mixture b) and then mixture c) are added. The resultant wax-polymer emulsion is excellently suited for the care of modern floorings in that a self-polishing coating is obtained the gloss of which can be increased by polishing to a value of 42.0.

A similar composition is obtained by repeating the above example, but using as levelling agent, first component in mixture c), 3.00 parts of maleic acid alkyl ester resin having an acid number of about 110, or 3.00 parts of styrene/maleic acid alkyl ester resin having a melting range of about 130 to 145° and an acid number of about 300.

EXAMPLE IV (Textile softener)

5.0 Parts of the same triazine compound as used in Example III,
95.0 parts of glacial acetic acid.

The triazine component is dissolved by gently heating in the glacial acetic acid. A clear solution is obtained.

This solution is excellently suited for the softening of textiles, particularly for turkish toweling which has become hardened by repeated washing. The goods to be treated are placed for a few minutes in a bath containing 1 to 2 g of the above solution per liter of water. After the treatment, the goods are wrung out and hung up to dry whereupon even very hardened and rough cotton toweling regains the original soft and fluffy handle. When repeating Examples I to IV, but replacing the guanidino-s-triazine derivatives used therein by the compounds falling under Formula I, the substituents $Y_1$, $Y_2$, $Y_3$ and $Y_4$ of which have the meanings given in the respective columns of the following table, then surface-treating agents and textile softeners are obtained which are particularly suitable for the protection of surfaces such as leather, wood and metal as well as for the softening of textiles:

| Compound No. | $Y_1$ | $Y_2$ | $Y_3$ | $Y_4$ | Melting range, degrees |
|---|---|---|---|---|---|
| 1 | —NH-n-$C_{18}H_{37}$ | —NH-n-$C_{18}H_{37}$ | —NH-n-$C_{18}H_{37}$ | —N($C_2H_4OH$)$_2$ | 68–70 |
| 2 | Same as above | Same as above | Same as above | —HN($CH_2$)$_3$N($CH_3$)$_2$ | 77–79 |
| 3 | do | do | do |  | ---------- |
| 4 | do | do | do |  | 74–76 |
| 5 | do | do | do |  | ---------- |
| 6 | do | do | do | 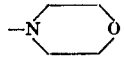 | 73–76 |
| 7 | do | do | do | 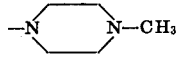 | 66–69 |
| 8 | —NH—$C_{18}H_{37}$ | —NH—$C_{18}H_{37}$ | —NH—$C_{18}H_{37}$ | —NH—($CH_2$)$_3\overset{+}{N}$($CH_3$)$_3$]I$^-$ | 88–92 |
| 9 | $CH_3$—N—$C_{18}H_{37}$ | $CH_3$—N—$C_{18}H_{37}$ | $CH_3$—N—$C_{18}H_{37}$ | —N($C_2H_4OH$)$_2$ | 62–64 |
| 10 | Same as above | Same as above | Same as above | —NH($CH_2$)$_3$N($CH_3$)$_2$ | 48–52 |
| 11 | do | do | do | —NH($CH_2$)$_{10}$COON$_3$ | 60–62 |
| 12 | do | do | do |  | 48–50 |
| 13 | do | do | do | 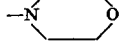 | 44–48 |
| 14 | do | do | do | 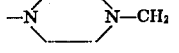 | 48–52 |
| 15 | do | do | do | --cyclo-dodecyl | ---------- |
| 16 | do | do | do | 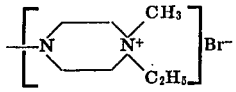 | ---------- |
| 17 | —NH-i-$C_3H_7$ | —NH-i-$C_3H_7$ | —NH-i-$C_3H_7$ | —N-n-$C_{19}H_{37}$ / $CH_3$ | 46–48 |
| 18 | —NH—$C_{18}H_{37}$ | —NH—$C_{18}H_{37}$ | —NH—$C_{18}H_{37}$ | —NH—($CH_2$)$_3$—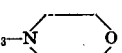 | 70–72 |
| 19 | —NH—$CH_2$—CH—$CH_2$ | —NH—$CH_2$—CH—$CH_2$ | —NH—$C_{18}H_{37}$ | —NH—$C_{18}H_{37}$ | 64–86 |
| 20 | —NH—$C_{22}H_{45}$ | —NH—$C_{22}H_{45}$ | —NH—$C_{22}H_{45}$ |  | 77–80 |
| 21 | —N—$C_{12}H_{25}$ / $C_4H_9$ | —N—$C_{12}H_{25}$ / $C_4H_9$ | —N—$C_{12}H_{25}$ / $C_4H_9$ | —NH($CH_2$)$_3$OH | ---------- |
| 22 | Same as above | Same as above | Same as above | —NH-bicyclo[3.2.1]octyl | ---------- |
| 23 | —NH—$C_{18}H_{35}$ | —NH—$C_{18}H_{35}$ | —N—$C_{12}H_{25}$ / $CH_3$ | 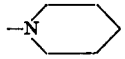 | ---------- |
| 24 | —NH—$C_{18}H_{35}$(OH) | —NH—$C_{18}H_{35}$(OH) |  | —NH—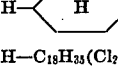H | ---------- |
| 25 | —N—$C_{16}H_{33}$ / $CH_3$ | —N—$C_{16}H_{33}$ / $CH_3$ | —NH—$C_{18}H_{35}$(Cl$_2$) | —NH—$C_{18}H_{35}$(Cl$_2$) | ---------- |
| 26 | —NH—$C_{12}H_{25}$ | —NH—$C_{12}H_{25}$ | —N—$C_6H_{13}$ / $CH_3$ | 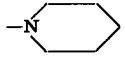 | ---------- |

—Continued

| Compound No. | $Y_1$ | $Y_2$ | $Y_3$ | $Y_4$ | Melting range, degrees |
|---|---|---|---|---|---|
| 27 | —NH—$C_6H_{13}$ | —NH—$C_6H_{13}$ | —NH—$C_{18}H_{36}F$ | —NH—$C_{18}H_{36}F$ | |
| 28 | —N($C_6H_{13}$)—$C_{12}H_{25}$ | —N($C_6H_{13}$)—$C_{12}H_{25}$ | —NH—$C_{19}H_{37}$ | —NH—$(CH_2)_5COOK$ | |
| 29 | —NH—$C_{12}H_{25}$ | —NH—$C_{12}H_{25}$ | —NH—$(CH_2)_2N(C_2H_5)_2$ | —NH—$(CH_2)_2N(C_2H_5)_2$ | |
| 30 | —NH—$CH_2$—CH—$CH_2$ | —NH—$CH_2$—CH—$CH_2$ | —NH—$C_{12}H_{25}$ | —NH$(CH_2)_3$—[N—$(CH_2)_3$]$_2$—N$(CH_3)_2$ | |
| 31 | —NH—$C_5H_{11}$ | —NH—$C_5H_{11}$ | —NH—$C_{18}H_{37}$ | —N⟨morpholine⟩·HCl | |
| 32 | —NH—$C_{12}H_{25}$ | —NH—$C_{12}H_{25}$ | —N⟨morpholine⟩ | —NH—$(CH_2)_5CONH$—$C_4H_9$ | |
| 33 | —N($CH_3$)—$C_6H_{13}$ | —N($CH_3$)—$C_6H_{13}$ | —N($CH_3$)—$C_{18}H_{37}$ | —NH adamantyl | |
| 34 | —N($CH_3$)$_2$ | —N($CH_3$)$_2$ | —NH—$C_{12}H_{25}$ | —NH—$C_{12}H_{25}$ | |
| 35 | —NH—CH—$CH_2$ | —NH—CH—$CH_2$ | —N($CH_3$)—$C_{18}H_{37}$ | —N⟨aziridine⟩ | |
| 36 | —NH—i—$C_3H_7$ | —NH—i—$C_3H_7$ | —NH—$C_{10}H_{21}$ | —N($C_2H_5$)$_2$ | |
| 37 | —N($C_2H_4OH$)$_2$ | —N($C_2H_4OH$)$_2$ | —NH—$C_{16}H_{33}$ | —NH—$C_{16}H_{33}$ | |
| 38 | —N($CH_3$)—$C_{18}H_{37}$ | —N($CH_3$)—$C_{18}H_{37}$ | —NH—$C_{12}H_{25}$ | —NH—$CH_2$—COONa | |
| 39 | same as above | same as above | same as above | —NH$(CH_2)_2$—[N($CH_3$)$(CH_2)_2$]$_3$N$(C_2H_5)_2$ | |
| 40 | —NH—$(CH_2)_5CON(CH_3)_2$ | —NH—$(CH_2)_5CON(CH_3)_2$ | —N⟨morpholine⟩ | —NH—$C_{18}H_{37}$ | |
| 41 | —NH—$C_4H_9$ | —NH—$C_4H_9$ | —NH—$C_{12}H_{25}$ | —NH—$CH_2$—CH—CH—COOK | |
| 42 | —NH—$C_{12}H_{25}$ | —NH—$C_{12}H_{25}$ | —N($CH_3$)—$C_{18}H_{37}$ | —NH—$C_{17}H_{33}$—COONa | |
| 43 | —NH—$CH_2$—$CH_2$—$CH_2Br$ | —NH—$CH_2$—$CH_2$—$CH_2Br$ | —N($CH_3$)—$C_{18}H_{37}$ | —N⟨piperidine⟩ | |
| 44 | —NH—$CH_2$—$CH_2$—$CH_2Cl$ | —NH—$CH_2$—$CH_2$—$CH_2Cl$ | same as above | same as above | |
| 45 | —NH—$C_{18}H_{37}$ | —NH—$C_{18}H_{37}$ | —NH—$C_{18}H_{37}$ | —NH$(CH_2)_2$N($CH_3$)—$(CH_2)_2$—$\overset{+}{N}(CH_3)_3Cl^-$ | |
| 46 | —N⟨pyrrolidine⟩ | —N⟨pyrrolidine⟩ | —NH—$C_6H_{13}$ | —NH—$C_{22}H_{45}$ | |
| 47 | —N⟨aziridine⟩ | —N⟨aziridine⟩ | —NH—$C_{10}H_{21}$ | —NH—$C_{18}H_{37}$ | |
| 48 | —N⟨piperidine⟩ | —N⟨piperidine⟩ | —NH—$C_{12}H_{25}$ | —NH—$C_{10}H_{25}$ | |
| 49 | —N⟨morpholine⟩ | —N⟨morpholine⟩ | —NH—$C_{18}H_{37}$ | —NH—$C_6H_{13}$ | |
| 50 | —N⟨piperazine-$N$-$CH_3$⟩ | —N⟨piperazine-$N$-$CH_3$⟩ | —NH—$C_{22}H_{45}$ | —N($CH_3$)—$C_{18}H_{37}$ | |
| 51 | —NH—⟨cyclohexyl⟩ | —NH—⟨cyclohexyl⟩ | —N($CH_3$)—$C_6H_{13}$ | —NH—$C_{18}H_{37}$ | |
| 52 | —N⟨azepane⟩ | —N⟨azepane⟩ | —N($CH_3$)—$C_{10}H_{21}$ | —NH—$C_{12}H_{25}$ | |
| 53 | [—N⟨piperazine-$\overset{+}{N}(CH_3)_2$⟩]$I^-$ | [—N⟨piperazine-$\overset{+}{N}(CH_3)_2$⟩]$I^-$ | —NH—$C_{18}H_{37}$ | —NH—$C_{18}H_{37}$ | |
| 54 | —N($C_2H_5$)$_2$ | —N($CH_3$)$_2$ | —NH—$C_{18}H_{37}$ | —NH—$C_{18}H_{37}$ | |

We claim:
1. A compound of the formula

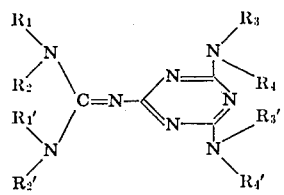

wherein
each of $R_1$, $R_1'$, $R_3$ and $R_3'$ represents hydrogen, 2-hydroxyethyl 3-hydroxypropyl or alkyl of from 1 to 4 carbon atoms,
each of $R_2$, $R_2'$, $R_4$ and $R_4'$ represents alkyl of from 1 to 18 carbon atoms, allyl, 2-hydroxyethyl or 3-hydroxypropyl,
at least one of $R_2$, $R_2'$, $R_4$ and $R_4'$ representing a long chain aliphatic radical of from 10 to 18 carbon atoms.

2. A compound as defined in claim 1, wherein said guanidino-s-triazine is 2-(1', 3'-di-isopropyl-guanidino)-4-isopropylamino-6-(methyl-n-octadecylamino)-s-triazine.

3. A compound as defined in claim 1, wherein said guanidino-s-triazine is 2-(1', 3'-di-n-octadecyl-guanidino)-4-n-octadecylamino-6-[bis-(2''-hydroxyethyl)-amino]-s-triazine.

4. A compound as defined in claim 1, wherein said guanidino-s-triazine is 2-(1',3'-dimethyl-1',3'-di-n-octadecyl-guanidino)-4-(methyl-octadecylamino)-6-[bis-(2''-hydroxyethyl)-amino]-s-triazine.

* * * * *

UNITED STATES PATENT OFFICE
CERTIFICATE OF CORRECTION

Patent No. 3,879,388      Dated April 22, 1975

Inventor(s) Denis Varsanyi et al.

It is certified that error appears in the above-identified patent and that said Letters Patent are hereby corrected as shown below:

In the heading, the line pertaining to the Assignee should read as follows:

Assignee:   CIBA-GEIGY Corporation
                   Ardsley, New York

Signed and Sealed this

Twenty-seventh Day of July 1976

[SEAL]

Attest:

RUTH C. MASON          C. MARSHALL DANN
*Attesting Officer*          *Commissioner of Patents and Trademarks*